United States Patent [19]

Okada

[11] Patent Number: 5,163,125
[45] Date of Patent: Nov. 10, 1992

[54] DATA PROCESSING APPARATUS

[75] Inventor: Kunio Okada, Kawasaki, Japan

[73] Assignee: Canon Kabushiki Kaisha, Tokyo, Japan

[21] Appl. No.: 877,374

[22] Filed: Apr. 29, 1992

Related U.S. Application Data

[63] Continuation of Ser. No. 644,689, Jan. 22, 1991, which is a continuation of Ser. No. 354,145, May 19, 1989.

[30] Foreign Application Priority Data

May 25, 1988 [JP] Japan ................... 63-125656

[51] Int. Cl.[5] ........................................... G06K 15/00
[52] U.S. Cl. ..................................... 395/115; 395/106
[58] Field of Search ........................ 395/101, 114–117, 395/164–166, 147, 106; 358/296, 462, 465, 450; 346/154; 340/747, 739, 750

[56] References Cited

U.S. PATENT DOCUMENTS

| | | | |
|---|---|---|---|
| 4,081,604 | 3/1978 | Kanaiwa | 178/30 |
| 4,251,837 | 2/1981 | Janeway, III | 358/455 |
| 4,682,190 | 7/1987 | Ikeda | 346/154 |
| 4,786,923 | 11/1988 | Shimizu | 346/154 |

FOREIGN PATENT DOCUMENTS

| | | | |
|---|---|---|---|
| 51857 | 5/1982 | European Pat. Off. | 364/519 |
| 2113950 | 8/1983 | United Kingdom | 364/519 |
| 8102083 | 7/1981 | World Int. Prop. O. | 364/519 |

*Primary Examiner*—Arthur G. Evans
*Attorney, Agent, or Firm*—Fitzpatrick, Cella, Harper & Scinto

[57] ABSTRACT

A data processing apparatus includes a first image signal generating source for sending a first image signal to a printer unit for printing the first image signal; a second image signal generating source for generating a second image signal different from the first image signal, the first image signal generating source being connectable to the second image signal generating source and having a combined image signal output mode for outputting a combined signal of the first and second image signals to the printer unit; and an inhibition unit for inhibiting a change from the combined image signal output mode to another image signal output mode while the printer unit is operating.

19 Claims, 7 Drawing Sheets

DATA PROCESSING APPARATUS

This application is a continuation of application Ser. No. 07/644,689, filed Jan. 22, 1991, which is a continuation of application Ser. No. 07/354,145, filed May 19, 1989.

BACKGROUND OF THE INVENTION

1. Field of the Invention

The present invention relates to a data processing apparatus for processing data such as code information and image information and sending the processed data to a printer unit.

2. Related Background Art

Recently, printers such as laser beam printers have rapidly spread far and wide.

The internal structure of a printer is mainly divided, from the standpoint of its function, into a controller unit for performing various controls and a printer unit for actually performing a print process.

The controller unit performs the following processes. Namely, it receives data from a host computer, edits the data into image information (dot information) on the character unit or page unit basis, and outputs to the printer unit the image information together with various print control signals.

The printer unit has a paper feed mechanism and an image forming mechanism such as a semiconductor laser unit, photosensitive drum and the like. The printer unit performs an actual print operation relative to a sheet in accordance with a control signal and image signal sent from the controller unit.

An interface signal group (such as an iamge signal, control signals including command signals and status signals, and other signals) transferred between the controller unit and printer unit is collectively called a video interface signal hereinafter.

With the above-described printer, however, only a single printer unit can be connected to a single controller unit. Therefore, the printer unit cannot have a sufficient operation rate. In addition, each host computer is required to have its dedicated printer unit, which is quite uneconomical. Although the Assignee has various inventions as disclosed in U.S. Pat. Nos. 4,786,923 and 4,682,190 respectively filed on May 20, 1986 and Apr. 30, 1986 and in U.S. patent application Ser. Nos. 947,425 filed on Dec. 29, 1986, No. 942,035 filed on Dec. 15, 1986, No. 291,349 filed on Dec. 29, 1988, No. 025,814 filed on Mar. 13, 1987, and No. 262,350 filed on Oct. 25, 1988. Further improvement has been desired.

SUMMARY OF THE INVENTION

It is an object of the present invention to eliminate the above-described disadvantages.

It is another object of the present invention to improve a data processing apparatus applied to printers or the like.

It is a further object of the present invention to provide a data processing apparatus capable of connecting a plurality of data sources to a single printer unit.

It is another object of the present invention to provide a data processing apparatus capable of raising an operation rate of the printer unit.

It is another object of the present invention to provide a data processing apparatus capable of outputting data sent from a plurality of data sources at a same time.

It is still another object of the present invention to provide a data processing apparatus which solves various problems encountered when a plurality of data sources are connected to a common printer unit.

It is a further object of the present invention to provide a data processing apparatus capable of combining data sent from different data sources and outputting the combined data.

It is another object of the present invention to provide a data processing apparatus which inhibits switching to another print mode while a combined image is outputted.

The other objects of the present invention will become apparent from the following description when read in conjunction with the accompanying drawings and from the appended claims.

DETAILED DESCRIPTION OF THE PREFERRED EMBODIMENT

A preferred embodiment of the present invention will be described in detail with reference to the accompanying drawings.

For a printer such as a laser beam printer whose printer unit and controller unit are connected by video interface signal lines, it can be considered that the video interface signal lines to the printer are extended outside of the printer to make them connectable to an additional external controller (e.g., such as an image scanner, hereinafter simply called an external controller). With such an arrangement, image data from a host computer can be printed under control of the controller unit, or the external controller directly controls the printer unit to print an image with a common printer unit.

Figure 4:
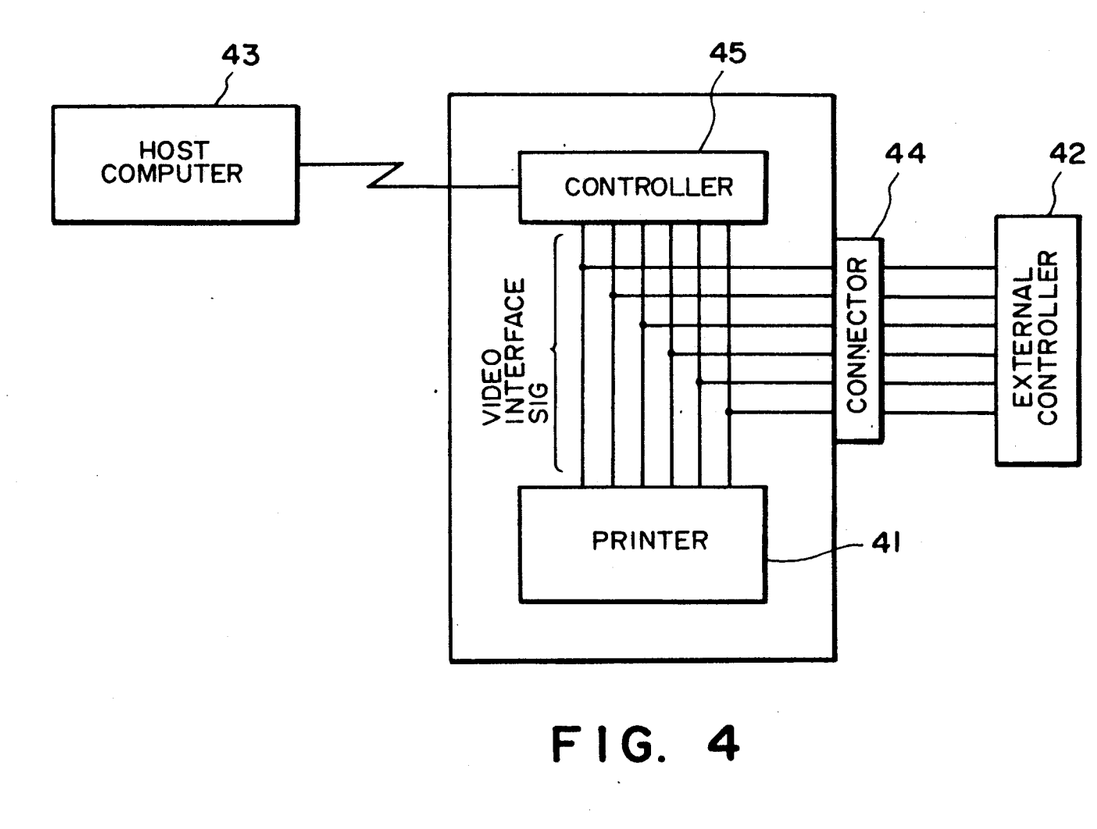
FIG. 4 is a block diagram showing the structure of a switching unit for switching between the controller unit and external unit.

Such an arrangement may be as shown in FIG. 4. In FIG. 4, video signal lines to a printer unit 41 are bifurcated into a connector 44 on the side of an external controller 42 at one hand, and on the other hand into a controller unit 45 to which data from a host computer 43 are supplied. In addition, mechanical or electrical switching means is provided at the bifurcating points to connect signals either of the external controller 42 or of the controller unit 45, to thus avoid contention of video signals to the printer unit 41.

With the arrangement shown in FIG. 4, however, established is either the connection between the controller unit 45 and printer unit 41 or the connection between the external controller unit 42 and printer unit 41. Therefore, images from both the controller unit 45 and external controller unit 42 cannot be printed with both the images being superposed one upon another and with the image positions being aligned.

The printer to be described hereinafter of this invention has the following structure. Namely, the printer constructed of at least a print controller unit and an image forming unit comprises input/output means for interfacing print data from a plurality of data sources, memory means provided at least in the print controller unit for storing image data corresponding to print data received from a first data source, and output means for outputting the image data stored in memory means from the print controller unit to the image forming unit in synchro with outputting image data supplied from a second data source to the image forming unit.

With the arrangement as above, image data corresponding to print data outputted from the first data source are stored in memory means. Thereafter, the image data stored in memory means are outputted to the image forming unit by output means in synchro with the image data supplied from the second data source.

Figure 1:
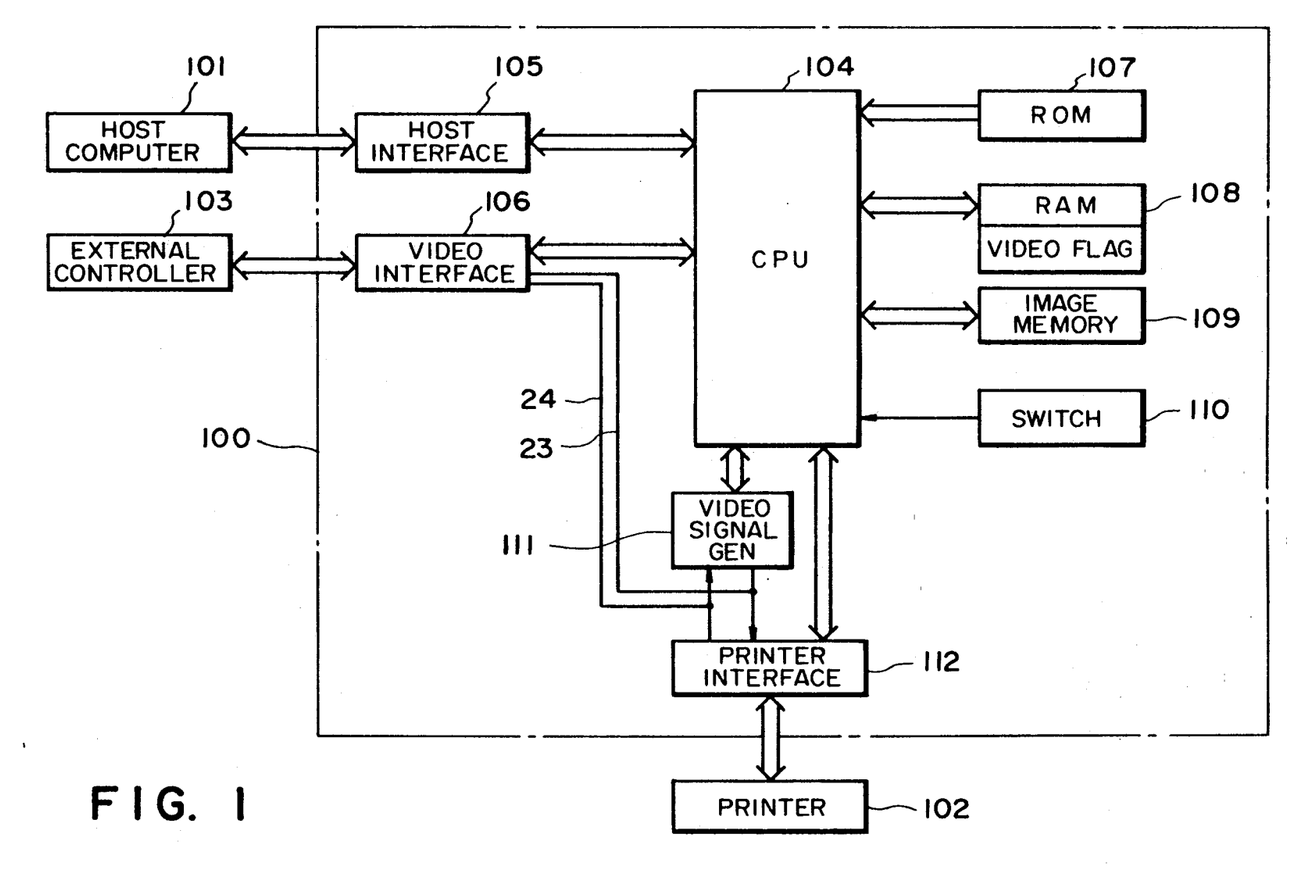
FIG. 1 is a block diagram showing the structural outline of an embodiment of a laser beam printer and the interconnection to external apparatus.

Description of the Structural Outline (FIG. 1)

FIG. 1 shows the structure of a controller unit or data processing apparatus 100 for a laser beam printer of the embodiment and its peripheral devices.

In FIG. 1, reference numeral 101 represents a host computer which sends print data such as character codes, and the like to the laser beam printer. Print data and various control data are inputted to a CPU 104 via a host interface 105. The host interface 105 is constructed of a general 8 bit parallel interface or serial interface such as RS232C, and transfers 8 bit code input signals, and various control signals used for hand-shaking, error display and the like.

Reference numeral 103 represents an external controller which outputs video signals to the laser beam printer independently from the host computer 101. Video interface signals outputted from the external controller 103 are inputted to a video interface 106. Then a fraction of video interface signals is sent to CPU 104, and another fraction is directly sent to a printer unit 102 via a printer interface 112 to form an image. The external controller 103 may use an image scanner for scanning an original, or have the same structure as the data processing apparatus 100.

CPU 104 controls the entirety of the data processing apparatus 100 in accordance with a program (refer to the flow charts shown in FIGS. 3A to 3B) stored in a ROM 107. ROM 107 also stores therein pattern information for various character codes, and various data. Thus, ROM 107 also functions as a character generator for generating a character pattern corresponding to an inputted character code. Reference numeral 108 represents a RAM mainly used as a working area of CPU 104. RAM 108 temporarily stores various data and has flags such as a video flag to be described later.

Reference numeral 109 represents an image memory which is inputted with code information from the host computer 101 and stores therein, in a bit map format, dot information pattern-developed in accordance with pattern data in ROM 107, dot information directly inputted, and the like. Reference numeral 110 represents a switch such as a rotary switch for selecting one of three modes A to C described below.

The mode A is a print function to control the printer unit 102 by the data processing apparatus 100 based on the data from the host computer 101. Namely the mode A is a print process wherein based on the data outputted from the host computer 101, image data are outputted to the printer unit 102 and printed out. The mode B is a print function to control the printer unit 102 by the data processing apparatus 100 based on the data from the external controller 103. Namely the mode 8 is a print process wherein image data outputted from the external controller 103 are outputted to the printer unit 102 and printed out. The mode C is a print function to control the printer unit 102 by the data processing apparatus 100 based on the data from the host computer 101 and external controller 103. Namely the mode C is a print process wherein image data outputted from the host computer 101 and external controller 103 are combined and outputted to the printer unit 102 and printed out.

Referring back to FIG. 1, reference numeral 111 represents a video signal generator for converting image data (dot information) in the image memory 109 into a video signal. Video signals of one line are outputted to the printer unit 102 in synchro with a synchro signal from the printer 102. Reference numeral 112 represents a printer interface for transfer of interface signals between the printer unit 102 and data processing unit 100.

The external controller 103 can output data (video signals) directly to the printer unit 102 via the video interface 106 and printer interface 112. Reference numeral 23 represents a VIDEO signal outputted to the printer unit 102 which signal will be described later, and 24 a beam detect signal (BD signal) from the printer unit 102 which signal is transferred directly between the video interface 106 and printer interface 112. Of interface signals for transfer between the external controller 103 and printer unit 102, the interface signals other than the VIDEO signal and BD signal are transferred between the video interface 106 and CPU 104.

When a print process of the mode B is executed, i.e., when the external controller 103 executes a print process, CPU 104 outputs a BUSY signal to the host computer 101 to notify it of disabled data reception.

Figure 2:
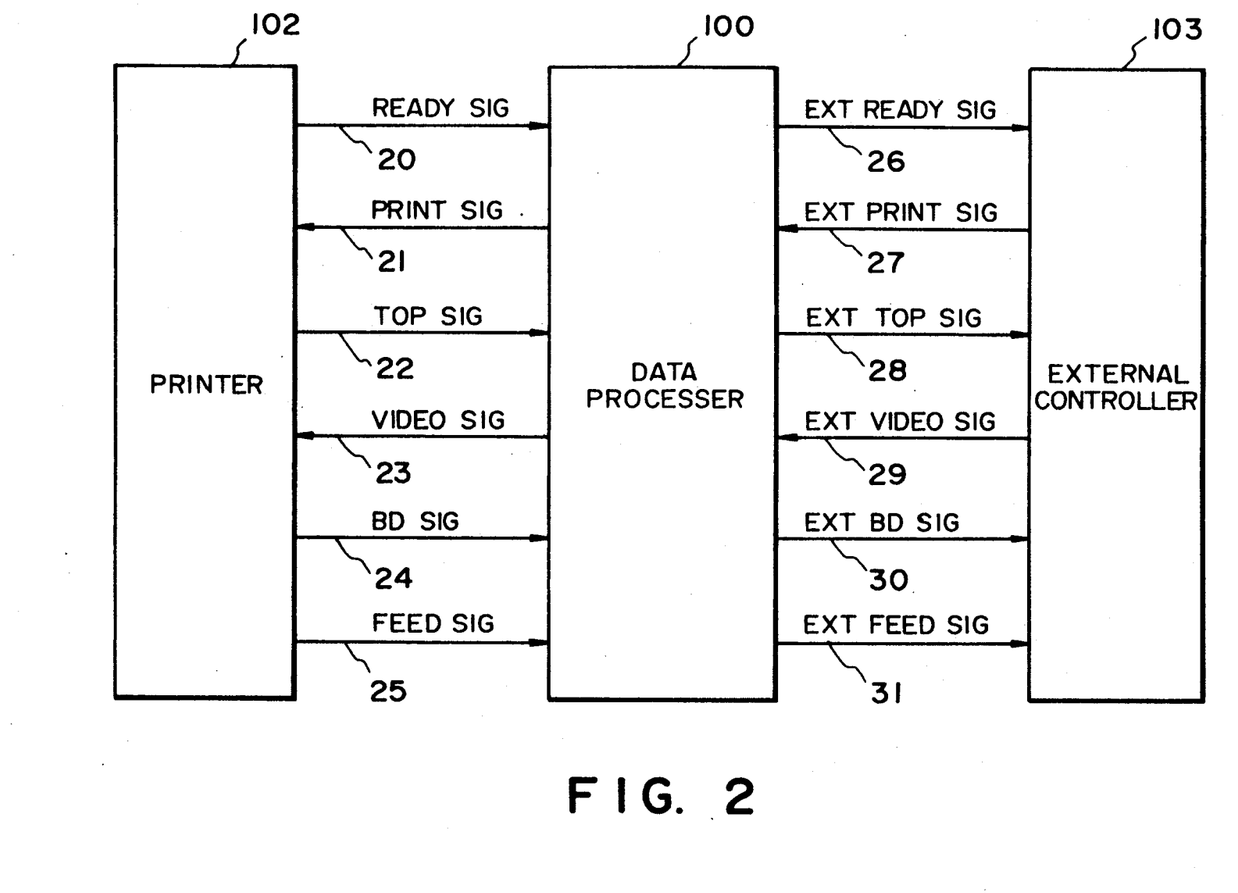
FIG. 2 illustrates interface signals transferred among the printer unit, data processing apparatus and external controller.

Description of Printer Unit and Interface (FIG. 2)

Interface signals between the printer unit 102 and data processing unit 100 are shown in FIG. 2.

In FIG. 2, reference numeral 20 represents a READY signal outputted from the printer unit 102 which signal is a status signal representative of whether the printer unit 102 is operable (ready) or not. Reference numeral 21 represents a PRINT signal which is turned on by the data processing apparatus 100 to start a paper feed operation of the printer unit 102 when the printer unit 102 is ready (on-state of READY signal 20). Reference numeral 22 represents a TOP signal outputted from the printer unit 102 which signal is outputted as a pulse signal when a paper sheet passes a predetermined position. The data processing apparatus 100 uses this signal as a vertical synchro signal, and upon reception of this signal 22, the data processing apparatus 100 causes the PRINT signal 21 to turn off to prepare a next paper feed request. The data processing apparatus 100 starts sending image signals of one page to the printer unit 102 in response to the TOP signal. Reference numeral 23 represents a VIDEO signal outputted from the data processing apparatus 100 or from the video interface 106 (external controller 103). Video signals of one scan line of a laser beam are outputted to the printer unit 102 in response to an image clock (not shown). Reference numeral 24 represents a BD (beam detect) signal used a horizontal synchro signal which BD signal is a pulse signal outputted from the printer unit 102 at each one scan line of a laser beam. BD signal is a well known signal indicating a beam scan position as disclosed in U.S. Pat. No. 4,059,833 and the like.

Reference numeral 25 represents a FEED signal outputted from the printer unit 102 and used for feeding a sheet, which signal is maintained on from the start time of paper feeding to the time when the sheet is completely ejected out of the printer unit 102.

Reference numerals 26 to 31 are interface signals corresponding to the signals 20 to 25, the interface signals 26 to 31 being transferred between the data processing apparatus 100 and external controller 103. The interface signals 26 to 31 are called respectively, an external READY signal 26, external PRINT signal 27, external TOP signal 28, external VIDEO signal 29, external BD signal, and external FEED signal, for the purpose of distinguishing them from the signals 20 to 25.

Figure 3A:
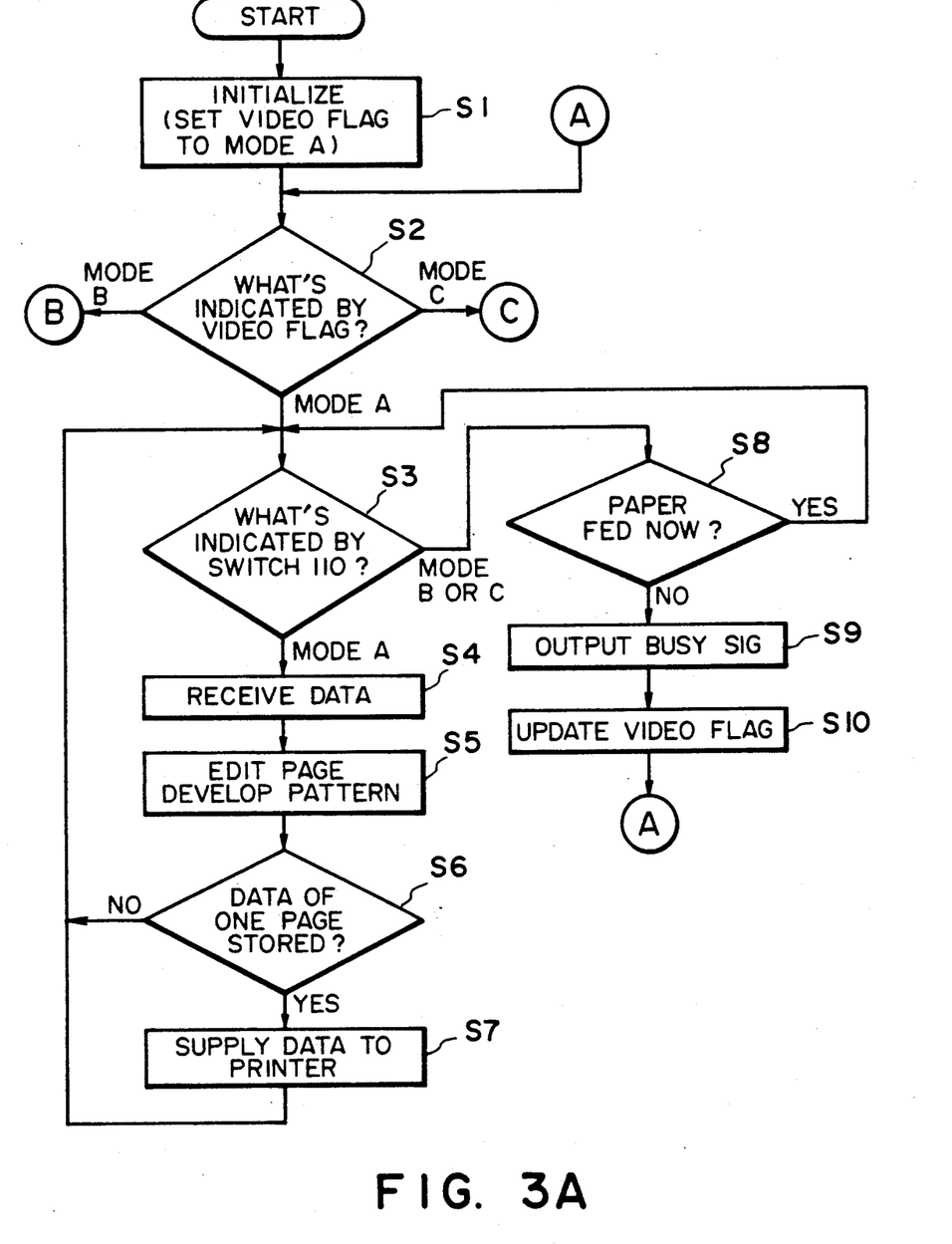
FIGS. 3A to 3C are flow charts illustrating the print process by the control unit of the embodiment.
Figure 3B:
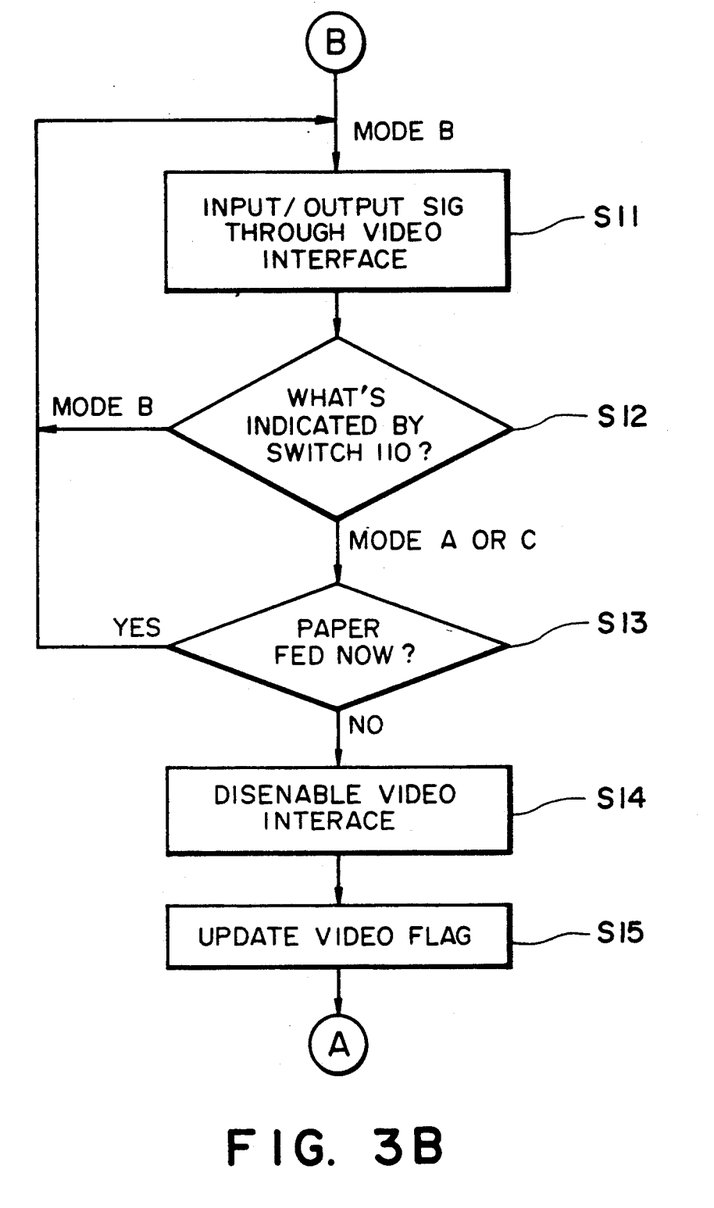
Figure 3C:
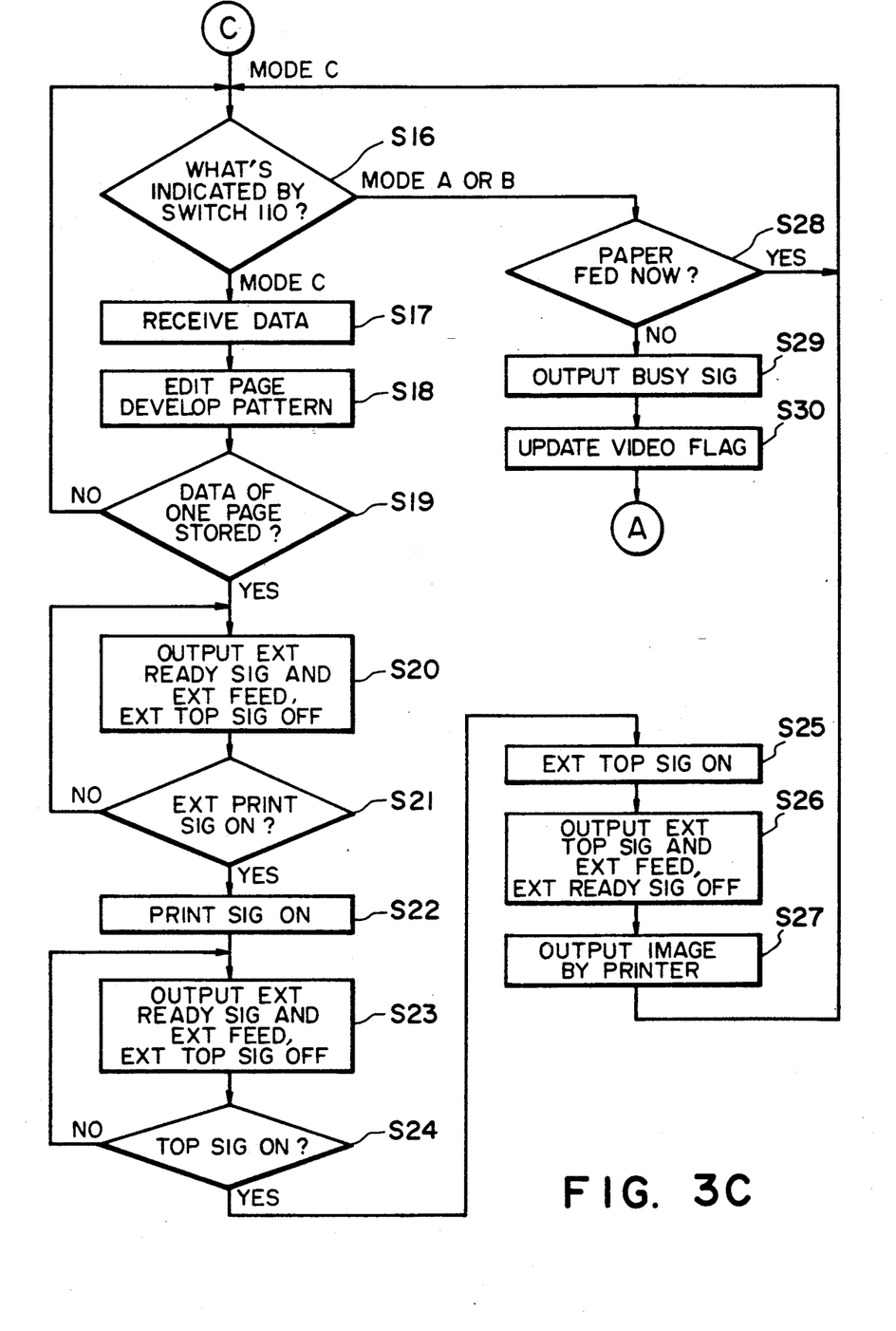

Description of Process Contents
(FIGS. 3A to 3C)

FIGS. 3A to 3C are flow charts illustrating an input process and switching process of print data from the host computer 101 and external controller 103, and an output process of video signals to the printer unit 102, respectively executed by the data processing apparatus 100.

First at step S1, as an initial value, a video flag is set to "Mode A" in order to perform various initialization processes. At this time, all the READY signal, TOP signal and FEED signal outputted to the external controller 103 via the video interface 106 are turned off so as to notify the external controller 103 of the fact that the printer unit 102 cannot be used.

Next, at step S2, the video flag in RAM 108 is checked. According to the content of the video flag, the flow goes to one of steps S3, S11 and S16 (Upon turning on the power, the video flag indicates the "Mode A" so that the flow advances to step S3).

Process in Mode A

In the video flag is judged as "Mode A" at step S2, the flow advances to step S3 whereat the status of the switch 110 is checked. If the switch 110 indicates "Mode A", the flow advances to step S4 whereat data from the host computer 101 are received via the host computer interface 105. At step S5, the received data are analyzed to perform a page edition, corresponding pattern data and the like are read out from ROM 107, and the character position on a page and the like are determined to perform pattern development into the image memory 109. Next, at step S6 it is judged if image data of one page have been stored in the image memory 109. If it is judged that image data of one page can be formed, then the flow advances to step S7 whereat the printer unit 102 is activated, and video signals are generated from the video signal generator 111 and outputted to the printer unit 102 to form an image.

If it is judged at step S3 that the switch 110 indicates the mode other than "Mode A", the flow advances to step S8 whereat it is checked if a paper sheet is being fed at the printer unit 102. If affirmative, the flow returns to step S3 to continue the interface operation to the host computer 101. The judgement if the paper sheet is being fed or not is determined based on if the FEED signal 25 from the printer unit 102 is turned on or not. If the FEED signal 25 is turned on (the paper sheet has been completely ejected out of the printer unit 102), then the flow advances to step S9 whereat the BUSY signal is outputted to the host computer 101 via the host interface 105. In such a manner, notified is that the data processing apparatus 100 is unable to receive data (inhibiting data input from the host computer 101). At step S10, the video flag in RAM 108 is changed to the previously checked mode, and the flow returns to step S2.

It is to be noted that in order to allow data reception from the host computer 101 at the process of step S4, the BUSY signal is released (turned off) immediately before this process.

In both the input mode (for outputting dot information formed within the data processing apparatus) and external mode (for outputting dot information from the external controller 103), the interface is switched after completion of one page print, thus preventing an imperfect print result from being outputted.

Process in Mode B

The process contents of the mode B will be described.

If the video flag is judged as "Mode B" at step S2, the processes from step S11 and the succeeding steps shown in FIG. 3B are carried out.

First, at step S11 an input signal from the external controller 103 is sensed via the video interface 106, and the input signal is sent via the printer interface 112 to the printer unit 102, whereas an input signal from the printer unit 102 is sensed via the printer interface 112, and the input signal is sent via the video interface 106 to the external controller 103.

Next, at step S12 the status of the switch 110 is checked. If the switch 110 indicates the mode B, the flow returns to step S11 without any operation. If the switch 110 indicates the mode (mode A or C) other than the mode B, the flow advances to step S13 whereat it is checked if a paper sheet is being fed at the printer unit 102. If a paper sheet is being fed, the flow returns to step S11. If not (if the FEED signal is turned on), it is judged as a completion of paper feeding so that at step S14 the external READY signal and the like at the video interface 106 are turned off. The video signals from the external controller 103 are accordingly inhibited. Then, the flow advances to step S15 whereat the video flag in RAM 108 is changed to the previously checked mode, and the flow returns to step S2.

Process in Mode C

If it is judged at step S2 that the video flag indicates "Mode C", the flow advances to step S16 whereat a print process for a combined image from the host computer 101 and external controller 103 is executed.

First at step S16, the status of the switch 110 is checked. If it is judged that the switch 110 selects the mode other than the mode C, then the flow branches to step S28 whereat it is checked if a paper sheet is being fed. If a paper sheet is being fed, the flow returns to step S16 to continue the interface operation to the host computer 101. If it is judged that a paper sheet feeding has completed, the flow advances to step S29 whereat the BUSY signal is outputted from the host interface 105 to the host computer 101 to notify that the data processing apparatus is unable to receive data, to thus inhibit data reception. At next step S30, the video flag is changed to the previously checked status of the switch 110.

If the switch 110 is judged as "Mode C" at step S16, the flow advances to step S17 whereat data are received by turning off the BUSY signal at the host interface 105. At next step S18, the received data are analyzed and subjected page edition, corresponding character pattern data and the like are read out from ROM 107, and the character position on a page and the like are determined to perform pattern development to the image memory 109. This process is repeated until such time when it is judged at step S19 that pattern development of one page has completed. At next step S20 the BUSY signal is outputted from the host interface to the host computer, and the status of the printer unit 102 is outputted to the external controller 103 via the video interface 106. In this case, the READY signal 20 and FEED signal 25 received from the printer interface 112 are directly outputted at the external READY signal 26 and external FEED signal 31. However, the external TOP signal is maintained off. The process at step S20 are repeated until such time when it is judged at step S21 that the external PRINT signal is outputted from the external controller 103. Namely, when image data of one page has been prepared in the image memory 109, the external controller 103 is notified of operation permission by using the external READY signal. Then, an actuation request of the printer unit 102 from the external controller 103 is waited.

Upon detection of an on-state of the external PRINT signal, the flow advances to step S22 whereat the PRINT signal is outputted to the printer unit 102 to actually start paper feeding. At step S23 the external READY signal and external FEED signal are outputted as representing the status per se of the printer unit, to the external controller 103, similar to the case at step S20. The external TOP signal is maintained off. At step S24, the process at step S23 is repeated until such time when the TOP signal is turned on at the printer unit 102.

Upon reception of the TOP signal (vertical synchro signal) from the printer unit 102, the data processing apparatus 100 causes the external TOP signal corresponding to the external controller 103 to be turned on at step S25. At step S26, the external TOP signal 28 and external FEED signal are outputted as representing the status per se of the printer unit 102, and the external READY signal 26 is maintained off. Therefore, the external controller is forced not to advance to the output operation of the next page until the external READY signal 26 is outputted at step S20 as representing the status per se of the printer unit 102.

Thereafter, at step S27, in synchro with the BD signal 24 and external BD signal 30 having the same timing, image data in the image memory 109 are outputted and at the same time, the image data outputted from the external controller 103 are combined therewith and printed out.

As described so far, according to the present embodiment, the external READY signal and external TOP signal are not outputted as they are, and the external PRINT signal is not sent directly as the PRINT signal, but the signal output is controlled in accordance with the preparatory condition of the data processing a apparatus. Therefore, image data outputted from the host computer 101 and external controller 103 are formed into output image without no position displacement.

In the above embodiment, a laser beam printer for editing and printing image data on a page unit basis has been described by way of example. However, the invention is not limited thereto. For instance, the principle of the present embodiment is applicable also to a serial printer such as an ink jet printer with the same advantageous effects.

Further in the above embodiment, a fraction of the video interface signals between the external controller 103 and printer unit 102 is transferred to the external controller 103 and printer unit 102 under control of CPU 104, and simultaneously therewith CPU 104 supervises the transfer of such video interface signals. However, the apparatus of this invention may be constructed in a following manner. Namely, all the video interface signal are directly connected between the external controller 103 and printer unit 102 similar to those between the data processing apparatus and printer unit, a switching circuit controllable by the data processing apparatus 100 is provided for the video interface signals, and there is provided means for allowing the data processing apparatus 100 to supervise the signals between the external controller 103 and printer unit 102. With such an arrangement, images from the external controller 103 and data processing apparatus 100 can be synchronized by selectively opening and closing signal paths. In this manner, displacement of images can be completely eliminated.

Furthermore, in the above embodiment, the same interface signals are used both between the data processing apparatus 100 and printer unit 102 and between the external controller 103 and data processing apparatus 100. Signal lines between the external controller 103 and data processing apparatus 100 may be provided additionally so that the mode under execution can be notified to the external controller 103 via such signal lines. With such an arrangement, the external controller 103 can discriminate different output modes and the meanings of signal changes (for instance, the external READY signal at "Mode C" in the above embodiment represents the operation permission status of the printer unit 102 as well as the image preparatory condition of the data processing apparatus 100). Such an arragement is particularly effective for a printer unit having a complicated function and additional interface signals so that interface signals become necessary, not necessary, or not usable depending upon an output mode.

Also in the above embodiment, the modes are selected by the switch. However, new signal lines may be added to the external controller so that the external controller can designate the mode.

Figure 5:
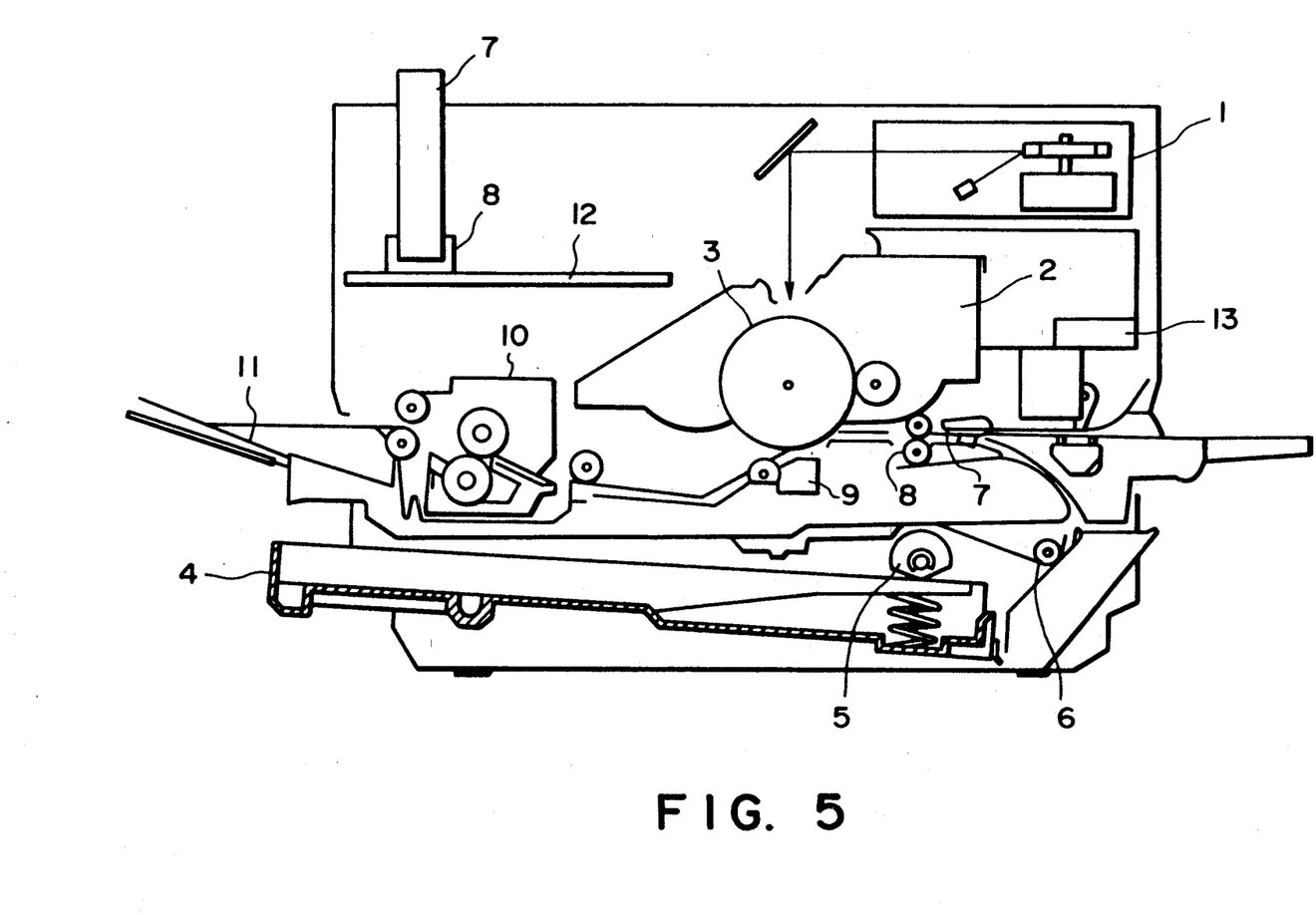
FIG. 5 is a schematic cross section of a laser printer to which the present invention can be applied.

FIG. 5 shows a cross sectional outline of a laser beam printer to which the present invention is applicable.

In FIG. 5, reference numeral 1 represents an exposure unit having a scanner and laser unit, and reference numeral 2 represents a developing unit for visualizing a latent image formed on a photosensitive drum 3. Reference numeral 4 represents a paper feed cassette, and reference numeral 5 represents a paper feed roller for supplying paper sheets one after another to a feed roller 6. Reference numeral 7 represents a registration shutter which temporarily stops a paper sheet fed with the feed roller 6 so that a synchronization is retained between radiation of a laser beam, rotation of the photosensitive drum 3, and paper feeding. Reference numeral 8 represents a transport roller for transporting a paper sheet to a transfer unit 9, 10 a fixing unit for fixing a toner image transferred on a paper sheet, and 11 a stacker unit for receiving ejected-out paper sheets.

Reference numeral 7 represents a character generator which can be dismounted, 8 a socket, 12 a CPU board mounted with CPU 104, image memory 109 and the like.

In the laser beam printer constructed as above, a series of operation timings such as paper feeding, development and the like are controlled by a sequence controller 13. A visual image is formed on the photosensitive drum 3 by turning on and off a laser beam in accordance with a video signal outputted from the printer interface 112.

The CPU board 12 corresponds to the data processing apparatus 100 shown in FIG. 1, and the elements other than the CPU board 12, character generator 15 and socket 14 correspond to the printer unit 102 shown in FIG. 1. The character generator 15 is used when character phonts (pattern signals) not included in the data processing apparatus 100 becomes necessary.

The present invention is not intended to be limited to the above-described embodiment, but various modifications are possible which should be constructed as falling within the scope of the appended claims.

I claim:

1. A data processing apparatus comprising:
   a first image signal generating source for sending a first image signal to a printer unit for printing said first image signal;
   a second image signal generating source for generating a second image signal different from said first image signal, said first image signal generating source being connectable to said second image signal generating source and having a combined image signal output mode for outputting a combined signal of said first and second image signals to said printer unit;
   a selector for selecting one of a plurality of image signal modes in said first image signal generating source, said plurality of image signal output modes including said combined image signal output mode; and
   inhibition means for inhibiting a change from said combined image signal output mode to another image signal output mode while said printer unit is operating.

2. A data processing apparatus according to claim 1, wherein said first image signal generating source has a first image signal output mode for sending said first image signal to said printer unit and a second image signal output mode for sending said second image signal to said printer unit.

3. A data processing apparatus according to claim 2, wherein said inhibition means inhibits a change from said combined image signal output mode to said first or second image signal output mode while said printer unit is feeding a print paper sheet.

4. A data processing apparatus according to claim 1, wherein said first image signal generating source is connectable to an external data generating source which generates character code data, and has processing means for processing a character code sent from said external data generating source and forming said first image signal.

5. A data processing apparatus according to claim 4, wherein said first image signal generating source further comprises storage means for storing said first image signal on the page unit basis.

6. A data processing apparatus comprising:
   data processing means connectable to both first and second data sources, said data processing means comprising image signal generating means for generating an image signal in accordance with data sent from said first or second data source, said image signal generating means having a combined image signal output mode for combining data sent from said first data source with data sent from said second data source, and obtaining and outputting a combined image signal;
   a selector for selecting one of a plurality of image signal output modes in said image generating source, said plurality of image signal output modes including said combined image signal output mode; and
   inhibition means for inhibiting a setting of said combined image signal output mode or a change from said combined image signal output mode to another image signal output mode, during a specified period.

7. A data processing apparatus according to claim 6, wherein said image signal generating means has a first image signal output mode for forming and outputting a first image signal in accordance with data sent from said first data source.

8. A data processing apparatus according to claim 7, wherein said image signal generating means has a second image signal output mode for forming and outputting a second image signal in accordance with data sent from said second data source.

9. A data processing apparatus according to claim 8, further comprising printing means for printing an image on a sheet in accordance with an image signal generated by image signal generating means;
   wherein said inhibition means inhibits a change from said first or second image signal output mode to said combined image signal output mode or a change from said combined image signal output mode to said first or second image signal output mode, while said inhibition means is receiving from said printing means a signal representative of that said sheet is being fed.

10. A printing apparatus connectable at the same time to a code data source and an image signal generating source for sending to said printing apparatus code data and a first image signal, respectively, said printing apparatus comprising:
    processing means for conducting processes on the code data to generate a second image signal;
    combining means for combining the first image signal and the second image signal to generate a third image signal;
    selecting means for selecting one of the first, second and third image signals; and
    a printer unit for performing a printing operation in accordance with the image signal selected by selecting means;
    wherein said processing means outputs the second image signal in synchronism with the first image signal when said selecting means selects the third image signal.

11. A printing apparatus according to claim 10, further comprising inhibition means for inhibiting said selecting means from selecting other image signals, during the printing operation.

12. A printing apparatus according to claim 10, wherein said printer unit performs the printing operation with an electrophotographic method, using an optical beam modulated on the basis of the image signals selected by said selecting means.

13. An image processing apparatus comprising:
    a memory for storing a first image signal;
    input means for inputting a second image signal from an external image signal generating source;

read-out means for reading out the first image signal from said memory and for outputting the first image signal, said read-out means outputting the first image signal in vertical synchronism with the second image signal so as to combine the first and second image signals; and sending means for sending the combined image signal to a printer unit, wherein the second image signal is transmitted from the external image signal generating source in horizontal synchronism with a horizontal sync signal generated by the printer unit.

14. An apparatus according to claim 13, wherein said apparatus works in any one of the following three modes, a first mode for sending the first image signal from said sending means to the printer unit, a second mode for sending the second image signal from said sending means to the printer unit, and a third mode for sending the combined image signal from said sending means to the printer unit; and wherein said read-out means outputs the first image signal in vertical synchronism with the second image signal when said apparatus works in the third mode.

15. An image processing apparatus comprising:

a memory for storing a first image signal;

input means for inputting a second image signal from a modular, detachable external image signal generating source;

read-out means for reading out the first image signal from said memory and for outputting the first image signal, said read-out means outputting the first image signal in synchronism with the second image signal so as to combine the first and second image signals;

sending means for sending the combined image signal to a printer unit, wherein said apparatus performs printing operation in either one of the following three modes, a first mode for sending the first image signal from said sending means to the printer unit, a second mode for sending the second image signal from said sending means to the printer unit, and a third mode for sending the combined image signal from said sending means to the printer unit, and wherein said read-out means outputs the first image signal in synchronism with the second image signal when said apparatus works in the third-mode; and prohibit means for prohibiting mode-change among the first, second and third modes when the printer is working.

16. An apparatus according to claim 13, wherein the printer unit performs a printing operation using an electrophotographic method, using an optical beam modulated on the basis of the image signal sent by the sending means.

17. An apparatus according to claim 16, further comprising control means for providing to the external image generating source an instruction signal for enabling or disenabling to output the second image signal in accordance with an operating state of the printer unit.

18. An apparatus according to claim 17, wherein the horizontal synch signal is transmitted to the external image signal generating source through said image processing apparatus from the printer unit.

19. An apparatus according to claim 15, wherein the sync signal is transmitted to the external image signal generating source through said image processing apparatus from the printer unit.

* * * * *

UNITED STATES PATENT AND TRADEMARK OFFICE
CERTIFICATE OF CORRECTION

PATENT NO. : 5,163,125
DATED : November 10, 1992
INVENTOR(S) : KUNIO OKADA

It is certified that error appears in the above-identified patent and that said Letters Patent is hereby corrected as shown below:

IN THE DRAWINGS:

SHEET 2 OF 7

FIG. 2, "PROCESSER" should read --PROCESSOR--.

SHEET 4 OF 7

FIG. 3B, "INTERACE" should read --INTERFACE--.

SHEET 7 OF 7

FIG. 5, "7" and "8" in upper portion of Fig. should read --15-- and --16--, respectively, to avoid duplicate use of reference numerals.

COLUMN 1

Line 34, "iamge" should read --image--.
Line 51, "1988. Further" should read --1988, further--.

COLUMN 4

Line 2, "mode 8" should read --mode B--.
Line 67, "used" should read --used as--.

COLUMN 5

Line 16, "external BD signal," should read --external BD signal 30,-- and "external FEED signal," should read --external FEED signal 31,--.
Line 41, "In" should read --If--.

UNITED STATES PATENT AND TRADEMARK OFFICE
CERTIFICATE OF CORRECTION

PATENT NO. : 5,163,125
DATED : November 10, 1992
INVENTOR(S) : KUNIO OKADA

It is certified that error appears in the above-identified patent and that said Letters Patent is hereby corrected as shown below:

COLUMN 7

Line 1, "subjected" should read --subjected to--.
Line 58, "a" should be deleted.
Line 61, "without no" should read --without--.

COLUMN 8

Line 9, "signal" should read --signals--.
Line 36, "arragement" should read --arrangement--.
Line 45, "cross sectional" should read --cross-sectional--.
Line 63, "7" should read --15--.
Line 64, "8" should read --16--.

COLUMN 9

Line 11, "phonts" should read --fonts--.
Line 15, "constructed" should read --construed--.

COLUMN 10

Line 50, "by se-" should read --by said se- --.

UNITED STATES PATENT AND TRADEMARK OFFICE
CERTIFICATE OF CORRECTION

PATENT NO. : 5,163,125
DATED : November 10, 1992
INVENTOR(S) : KUNIO OKADA

Page 3 of 3

It is certified that error appears in the above-identified patent and that said Letters Patent is hereby corrected as shown below:

COLUMN 12

Line 4, "either" should read --any--.
Line 13, "third-mode;" should read --third mode;--.

Signed and Sealed this

Thirtieth Day of November, 1993

Attest:

BRUCE LEHMAN

*Attesting Officer*

*Commissioner of Patents and Trademarks*